Nov. 20, 1951    O. W. OERMAN    2,575,527
TWO-WAY PLOW
Filed Aug. 2, 1944    7 Sheets-Sheet 1

INVENTOR.
OREY W. OERMAN

ATTORNEYS

Nov. 20, 1951 O. W. OERMAN 2,575,527
TWO-WAY PLOW
Filed Aug. 2, 1944 7 Sheets-Sheet 2

INVENTOR.
OREY W. OERMAN
BY
ATTORNEYS

Nov. 20, 1951     O. W. OERMAN     2,575,527
TWO-WAY PLOW
Filed Aug. 2, 1944     7 Sheets-Sheet 3
FIG. 3
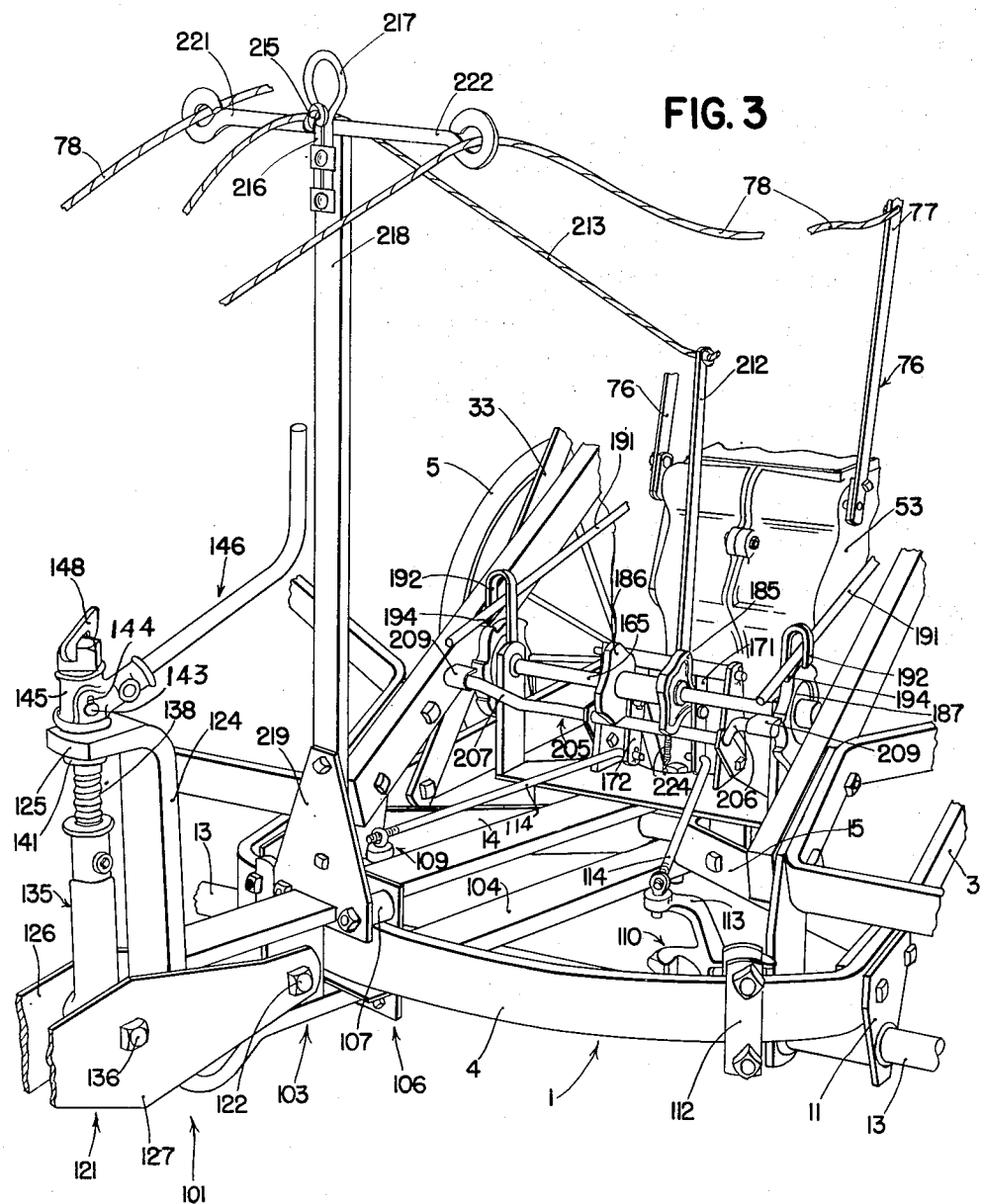
INVENTOR.
OREY W. OERMAN
ATTORNEYS

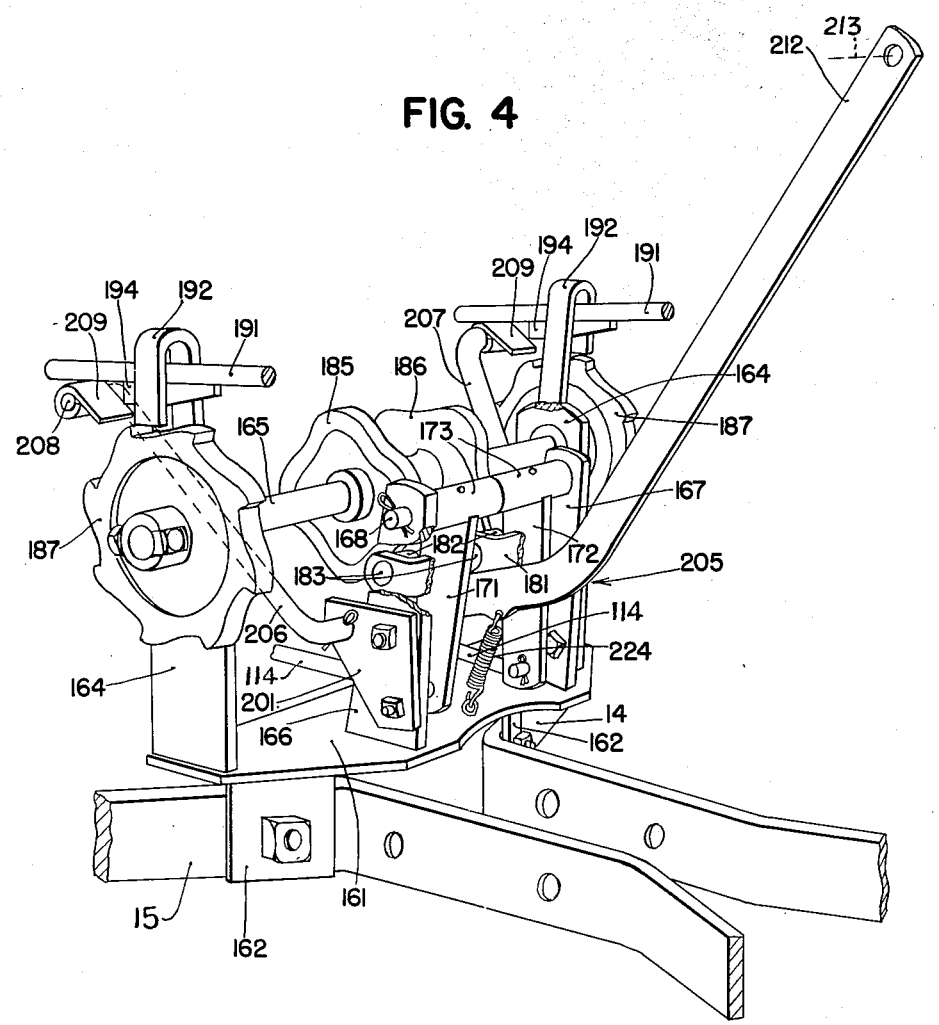

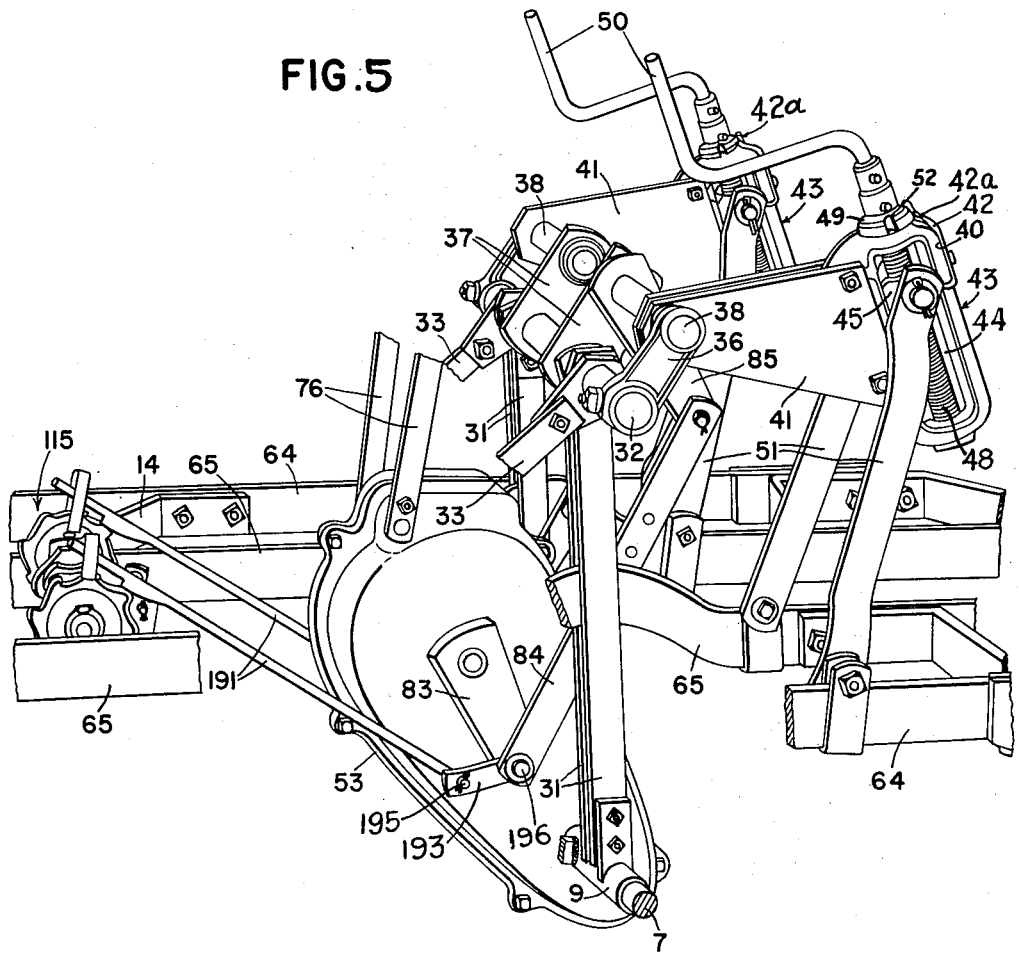

Nov. 20, 1951     O. W. OERMAN     2,575,527
TWO-WAY PLOW

Filed Aug. 2, 1944     7 Sheets-Sheet 6

INVENTOR
OREY W. OERMAN
BY
ATTORNEYS

Nov. 20, 1951     O. W. OERMAN     2,575,527
TWO-WAY PLOW

Filed Aug. 2, 1944     7 Sheets-Sheet 7

INVENTOR
OREY W. OERMAN
BY
ATTORNEYS

Patented Nov. 20, 1951

2,575,527

UNITED STATES PATENT OFFICE 2,575,527

TWO-WAY PLOW

Orey W. Oerman, Moline, Ill., assignor to Deere & Company, Moline, Ill., a corporation of Illinois Application August 2, 1944, Serial No. 547,784

18 Claims. (Cl. 97—29)

The present invention relates generally to agricultural implements and more particularly to two-way plows which are especially adapted for use where it is desired to throw all of the furrows in the same direction.

The object and general nature of the present invention is the provision of a two-way plow, preferably of the two-bottom type in which the two plowing units are arranged in side-by-side relation, in which new and improved lifting mechanism is provided. More specifically, it is a feature of this invention to provide a laterally shiftable hitch, adapted to be held by suitable latch means in a position at one side or the other of the frame so as to be disposable in a position in front of one or the other of the plowing units, in connection with new and improved mechanism for controlling the latches and actuated by the lifting mechanism. A further feature of this invention is the provision of an adjustable hitch member, with new and improved means for locking the adjustment against displacement, and in this connection it is a further feature of this invention to provide improved raising mechanism in which when the plowing unit is moved into operating position, it is held in that position in a rigid and positive manner, so that the hitch to the plowing unit in operating position is, in effect, a relatively long beam.

Another feature of the present invention is the provision of a constant lift type of raising means for an implement of this kind. It is also a feature of this invention to provide for disabling the automatic latch control so that, when desired, either or both of the plowing units may be raised or lowered without affecting the hitch connection.

These and other objects and advantages of the present invention will be apparent to those skilled in the art after a consideration of the following detailed description, taken in conjunction with the accompanying drawings in which the preferred form of the invention has been illustrated.

In the drawings:

Figure 3 is a perspective view, showing the hitch controlling cams and associated parts.

Figure 4 is a perspective view of the cams, showing the cam disabling means in a position disconnecting the latch control from the lifting mechanism.

Figure 5 is a perspective view showing the lift linkage and associated parts with both the right and the left hand units in a partially raised position.

Figure 1:
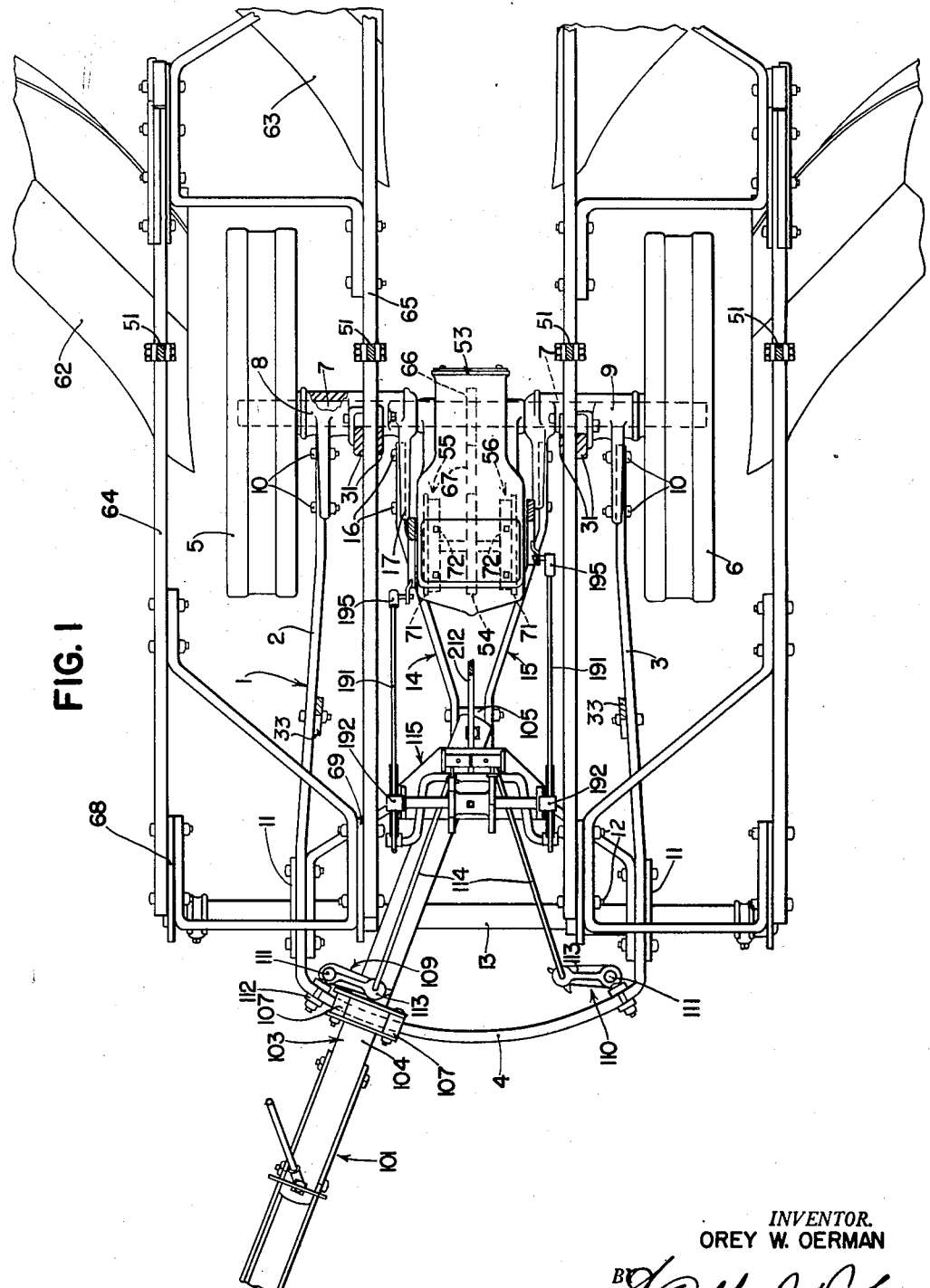
Figure 1 is a plan view of a two-bottom, two-way plow of the towed type, in which the principles of the present invention have been incorporated, parts being cut away or omitted in order to show the construction more clearly.
Figure 2:
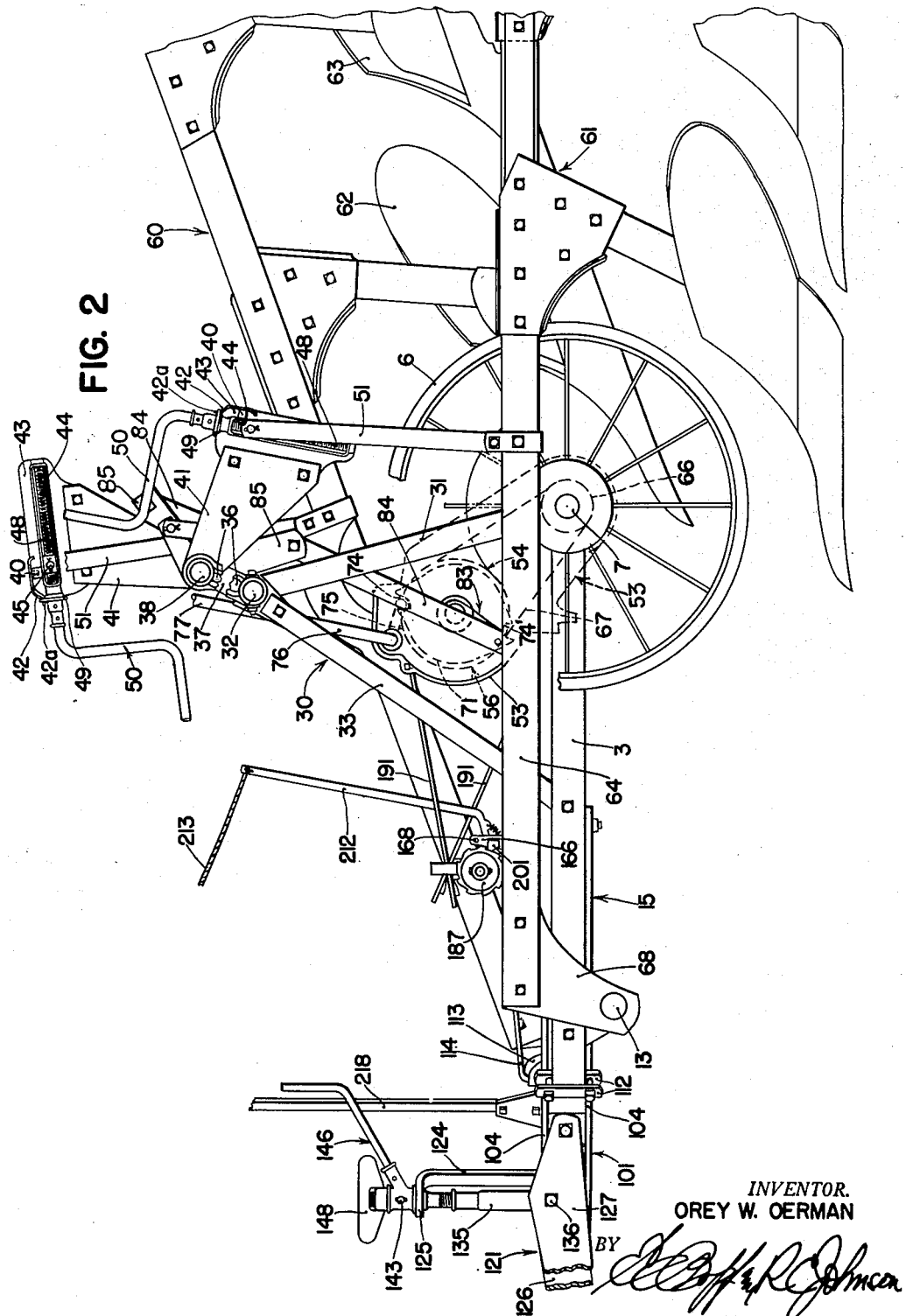
Figure 2 is a side view of the plow shown in Figure 1, certain parts being broken away in order to illustrate the features with which the present invention is more particularly concerned.
Figure 7:
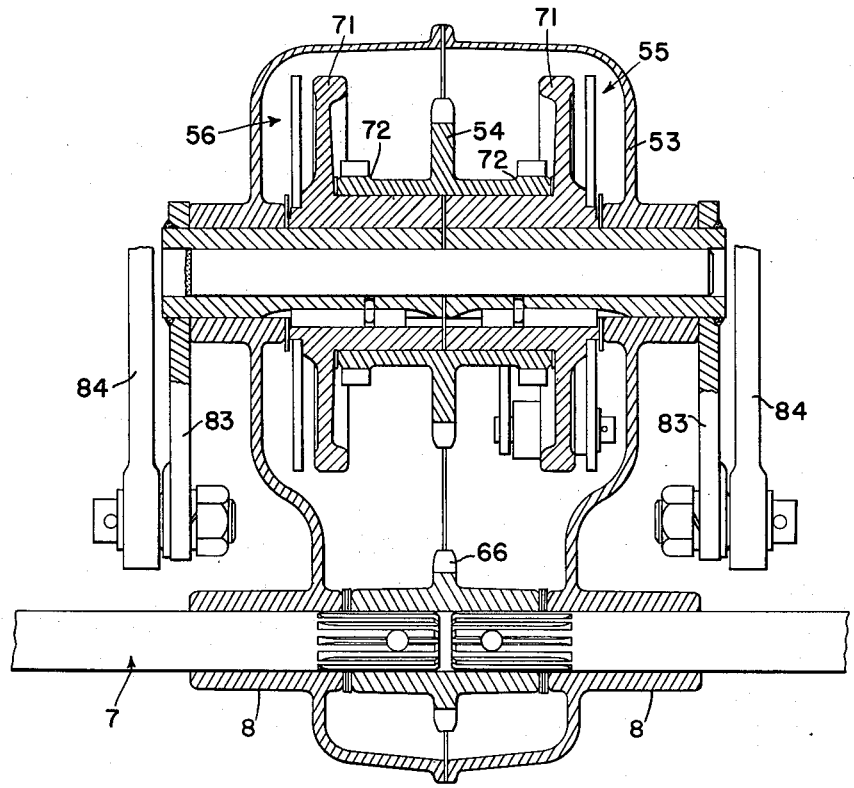
Figure 7 is a view taken generally along the line 7—7 of Figure 6.
Figure 6:
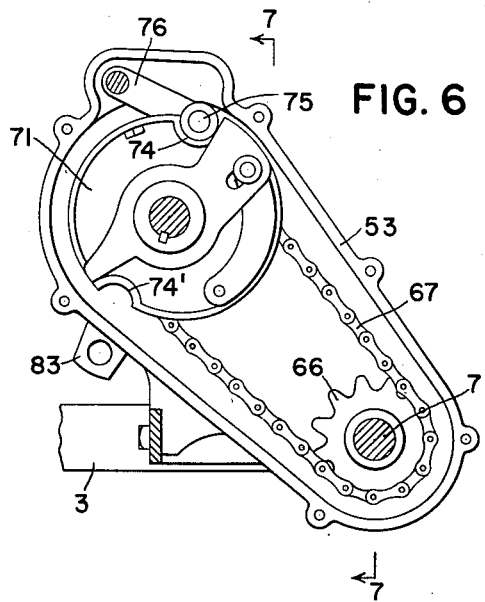
Figure 6 is a sectional view showing one of the self-interrupting clutch units and the manner of driving the same.

Referring now more particularly to Figures 1 and 2, the reference numeral 1 indicates in its entirety the frame of the implement which, in general, consists of generally longitudinally extending frame bars 2 and 3 connected together at their forward ends by a curved or arcuate section 4 and supported at their rear portions on a pair of ground wheels 5 and 6 which are respectively fixed to opposite ends of a live axle 7 which pass through journal or bearing members 8 and 9 that are fixed, as by bolts 10, to the rear ends of the bars 2 and 3. A pair of brackets 11 is fixed to the forward portions of the bars 2 and 3 and are apertured to receive a bar or shaft 13 which extends laterally outwardly at opposite sides of the frame 1. A generally V-shaped brace 14 with its apex disposed generally laterally inwardly is bolted at its front end, as indicated at 12, to the front portion of the frame bar 2 and at its rear end is bolted, as at 16, to an extension 17 on the associated bearing member 8. A similar brace 15 is likewise attached to the front and rear portions of the frame 1. The right and left hand plowing units, referred to below, are pivotally connected to the shaft 13 for generally vertical swinging movement.

As a part of the frame 1, the latter is provided with a lifting frame section 30 which includes a pair of upright bars 31 at each side of the main frame 1 on which a cross bar or shaft 32 is carried. There is a pair of bars 31 at each side of the frame, and the bars 31 are reenforced by a downwardly extending diagonal brace 33 at each side of the frame. Secured to each end of the bar 32 is a supporting bracket 36. Each bracket 36 has an upper apertured section. Centrally of the cross bar 32 is a pair of brackets 37, and each pair of brackets 36, 37 supports a rockshaft 38 that is carried for rocking movement in a generally vertical direction.

An arm 41 is fixed to the outer end of each of the rockshafts 38, adjacent the associated bracket 36. At its outer end each arm 41 carries a member 43, preferably a casting, in which a slot 44 is disposed. A pivot block 45 is disposed in the slot 44 and in threaded engagement with a crank screw adjusting rod 48 which is journaled for rotation in the casting 43 and, when turned by the crank 50, serves to run the pivot block 45 in one direction or the other in the slot 44. Each arm member 43 has a boss 40 to which one end of a leaf spring 42 is fixed. The other end 42a of the leaf spring 42 is rounded and engageable in one of four or more notches 52 formed in an extended flange section 49 of a crank member 50 fixed in any suitable way to one end of the adjusting screw 48. The spring 42 holds the crank from turning out of adjustment. Each arm 41 is provided with a construction of this kind. Also, each pivot block 45 is pivotally connected to the associated plowing unit by bail straps 51.

The plowing units are substantially identical, except that one is a right hand unit and the other is a left hand unit, and hence a detailed description of one plow unit will suffice. The right hand plowing unit is indicated in its entirety by the reference numeral 60 and the left hand plowing unit is indicated in its entirety by the reference numeral 61. Referring first to the right hand unit, plow bottoms 62 and 63 are connected, respectively, to the rear ends of plow beams 64 and 65, the latter being somewhat longer than the outer beam 64. At their forward ends the beams 64 and 65 are provided with brackets 68 and 69 which extend downwardly and are apertured to receive the right end of the cross shaft 13. Preferably, the inner bracket 69 is disposed inside the right frame bar 2, and collars or the like mounted on the shaft 13 serve to hold the brackets 68 and 69 against lateral displacement. The lower ends of the bail straps 51 at the right side of the implement are pivoted to the beams 64 and 65, and the laterally inner beam 65 is disposed between the two vertical bars 31 forming a part of the lifting frame. The ground wheel 5 at the right side of the implement is disposed between the beams 64 and 65 of the right hand plowing unit 60.

The axle 7 passes through not only the bearing sections 8 and 9 but also the lower rear portion of a clutch casing 53. Secured to the central portion of the live axle 7 is a drive sprocket 66 over which a chain 67 is disposed. The upper portion of the chain 67 is trained over the driving member 54 of a pair of self-interrupting clutches indicated by the reference numerals 55 and 56. Each self-interrupting clutch is of conventional construction, so far as the present invention is concerned, embodying a driven member 71, a driving member 72 connected with the driving sprocket 54. Each driven member 71 has a notch 74 therein in which the roller end 75 of a trip lever 76 is normally disposed when the clutch is not in operation. Each trip lever has an operating extension 77 to which an operating cable 78 (Figure 3) is connected. Each driven member 71 of the clutch includes a shaft section that extends outwardly of the clutch casing 53 and carries a crank 83 secured thereto. Each crank 83 is connected by an upwardly extending link 84 with an arm 85 that is secured, as by welding, to the inner portion of the rockshaft 38 at the side of the plow. Thus, whenever the trip lever section 77 is swung forwardly, the clutch is placed in operation and, deriving energy from the live axle 7 to which the wheels 5 and 6 are connected, the crank is driven rearwardly and then upwardly and exerts a lifting force through the associated arm 41 and bail straps 51, lifting the associated plowing unit into a raised or transport position. The clutch parts are so arranged that when the plow is raised, the clutch continues in operation for a slight additional time, sufficient to cause the crank 83 to be moved past a dead-center relationship with the link 84. Then the trip lever 76 drops into another notch 74', thus locking the driven member 71 of the clutch against further action, whereby the plow is held in a raised position. By pulling on the cable 78, the trip lever 76 may be disengaged from the notch, and this, through suitable mechanism (not shown), causes the driving and driven members of the clutch to engage, whereby the crank 83 is driven through approximately a half revolution, whereupon the trip lever 76 engages in the other notch, thus holding the crank in its other position. In this way, the clutch serves to lock the plow either in its raised position or in its lowered position.

Each of the clutches 55 and 56 therefore represents any known form of power lift apparatus in which parts may be raised or lowered by power and held in a raised or a lowered position.

Normally, the implement is operated with one of the plowing units in lowered or plowing position while the other unit is held in a raised or transport position. In order best to accommodate this arrangement, the main frame 1 is provided with a laterally swingable hitch unit 101 which at its forward end is adapted to be hitched to a tractor or some other form of propelling power. The hitch unit 101 comprises a laterally swingable member 103, preferably made up of a pair of vertically spaced bars 104, pivoted at its rear end to a block 105 bolted between the apical portions of the braces 14 and 15. The bars 104 are disposed so as to lie on opposite sides of the arcuate frame section 4, and preferably the member 103 carries a guide structure 106 which includes upper and lower rollers 107. The guide structure 106 is adapted to be engaged by one or the other of a pair of hitch latches 109 and 110. Each of these hitch latches is pivotally mounted, as at 111, on a clamp support 112 and includes an arm 113 that is connected by a link 114 to a cam control unit, indicated in its entirety by the reference numeral 115. More detailed description of the cam control unit 115 will appear below. The forward portion of the hitch member 101 is formed with a section 121 that is pivoted, as at 122, to the member 103. The forward end of the latter includes a vertical support 124 which has its upper end turned forward, as at 125. The member 121, or forward section of the hitch, includes a pair of vertical side plates 126 and 127 which at their forward ends are connected through a spring cushion unit to a tractor or other propelling means. A vertical tubular section 135 is swiveled, as at 136, to the laterally spaced plates 126 and 127 and at its upper end is interiorly threaded to receive the lower end of a threaded crank screw adjusting rod 138. The latter extends upwardly through an opening in the support 124. A collar 141 is fixed to the adjusting rod 138, and above the support 124 the crank screw adjusting rod 138 is provided with an opening through which a bolt 143 extends. The bolt is disposed in a pair of slots 144 formed in the hub section 145 of a crank 146 that is in this manner connected non-rotatably to the rod 138. By virtue of the slots 144, the hub section 145 has limited vertical movement with respect to the rod 138, but whenever the crank 146 is rotated the rod 138 is likewise rotated in the tubular threaded member 135. Therefore, turning the crank 146 will raise or lower the front end of the hitch section 121. The uppermost threaded end of the rod 138 is provided with a wing nut 148 which when tightened serves to clamp the hub section 145 down against the support 124, drawing the collar 141 firmly up against the under side of the support section 125. Thus, when the proper adjustment of the front end of the hitch has been effected, tightening the wing nut 148 serves to maintain the crank 146 in position and prevent displacement thereof. This clamping of the crank against the support has in addition another important function, namely, to positively clamp or lock the vertically pivoted hitch section 121 against vertical displacement with respect to the other member 103 that forms a part of the hitch 101. The latter, therefore, is a rigid part, rigidly connected with the frame of the plow through the guide structure 106, and since the plow bottom lowered in operating position is, by its associated self-interrupting clutch, also locked to the frame 1, it will be seen that, when in operating position, the down pair of bottoms swing generally about the forward hitch point with the tractor, the hitch and the frame 1, together with the plow beams 64 and 65 and associated parts, all serving as a single rigid relatively long plow beam.

Figure 8:
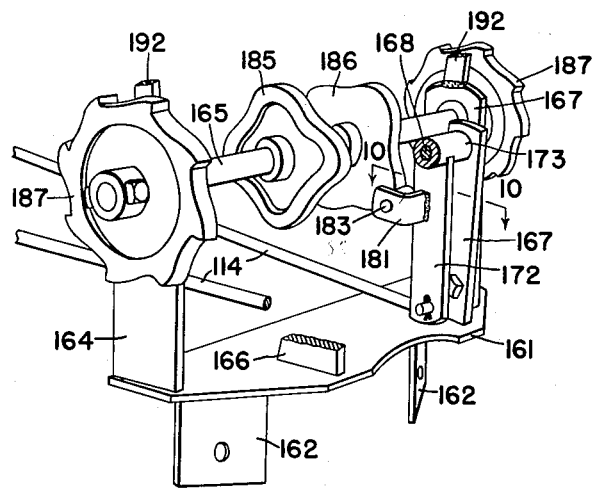
Figures 8 and 9 are fragmentary perspective views showing certain details of the latch controlling cams, the cam disabling means, and associated parts.
Figure 9:
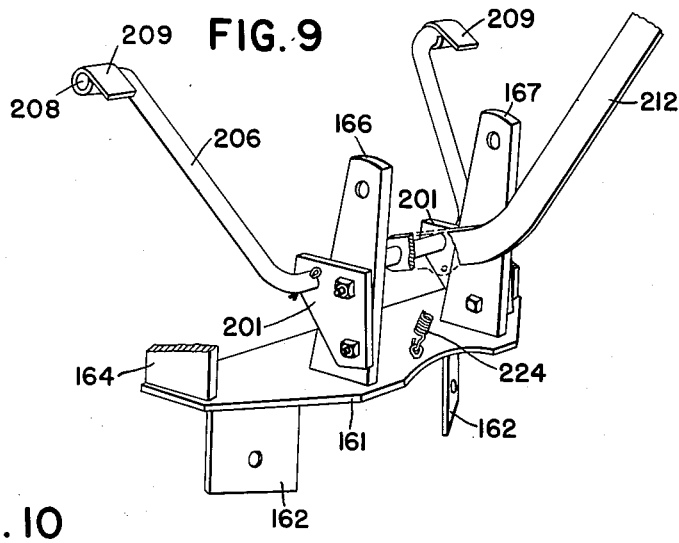
Figure 10:
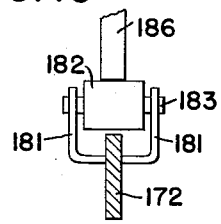
Figure 10 is a sectional view taken along the line 10—10 of Figure 8.

Reference was made above to the fact that the hitch 101 is swingable from one side to the other, in order to dispose the forward end thereof in front of the down bottoms. Reference was also made to the fact that one or other of the latches 109 and 110 serves to engage a part of the hitch and hold it in one position or the other. In normal operation, when the end of one furrow is reached, the operator pulls the proper cable and raises that plowing unit into a transport position. He then turns the outfit around and then pulls the other plowing unit into operating position. During this action, it is desirable to release the first latch in order to make use of the turning effort to swing the hitch from one position to the other, and even while both plowing units are in raised position, it is desired to operate the latches so that when one releases the hitch for swinging toward the other side, the other is operated to permit it to engage the hitch when it reaches the other side of the frame and thus lock it in a position so that its front end will be in front of the other plowing unit when it is lowered after the outfit has been turned around and ready to start across the field. My new and improved hitch controlling cam mechanism will now be described. Referring particularly to Figures 3 and 4, a plate 161 is disposed transversely of the main frame and is provided with a pair of apertured ears 162 by which the plate 161 may be fastened in place on the frame 1 by bolting it to the brace bars 14 and 15. Extending upwardly from each end of the plate 161 is a bracket 164 which is apertured at its upper end, and supported for rotation in the brackets 164 is a cam shaft 165. Another pair of brackets 166 and 167 are also carried by the plate 161, and the upper ends of these brackets are apertured to receive a cross shaft 168. Mounted on the cross shaft 168 is a pair of levers 171 and 172, one being swingable generally in a fore and aft direction with respect to the other, and each including a tubular bushing section 173 which facilitates the mounting of the levers 171 and 172 on the shaft 168. Each of the levers 171 and 172 is provided with a pair of forwardly extending apertured lugs 181 between which a roller 182 is disposed and carried on a short shaft 183 (Figs. 4 and 8). Each lever is provided with a roller supported in this manner, and cooperating with the rollers just described is a pair of cam members 185 and 186 welded or otherwise firmly fixed to the cam shaft 165. Each end of the cam shaft carries a ratchet 187, each ratchet being provided with eight teeth, although the number may vary as desired. The ratchets 187 are operated by pawl mechanism operated by the clutch cranks 83. Associated with the right clutch crank 83 is a rod or link 191 which, at its forward end, passes through an inverted U-guide 192, and this end of the link or rod 191 is provided with a pawl member 194 (Figs. 3–5). The rod 191 extends forwardly a short distance beyond the associated pawl 194. The rear end of the rod or link 191 is connected at 195 with an arm 193 (Figure 5) that is fixed to the lower end of the associated lift link 84 closely adjacent the pivot 196 that connects the lower end of the link 84 with the crank 83. The pawl construction associated with the left clutch is substantially identical, and hence the same reference numerals have been employed.

The right lever 172 is connected by one of the links 114 mentioned above with the right latch 109, and similarly, the other link 114 is connected at its forward end with the left latch 110 and at its rear end with the lever 171.

The parts are so arranged that when either clutch is operated to raise the associated plow unit, the latter portion of movement of the crank 83, as the clutch moves to its raised position, shifts the associated link 191 forwardly, the pawl 194 engaging the associated ratchet wheel 187. However, the pawl 194 moves out of engagement with the ratchet wheel 187 by the time the crank 83 reaches its uppermost position, by which time the ratchet wheel has been rotated through 45 degrees. Thereafter when the associated clutch is again operated, as to lower the plows, the pawl 194 moves farther forward and then backward, ratcheting over the wheel 187 as the crank arm reaches its lower position, and also as the crank arm 83 swings rearwardly and upwardly during the first part of the next raising operation. The aforesaid 45 degree movement is sufficient to advance one of the projections on one of the cam members 185 and 186 into engagement with the roller of one of the levers 171 and 172 and to bring one of the dwell portions of the other cam member opposite its lever, for example, the lever 171 as shown in Figure 4. Whenever the dwell portion of either of the cam members comes opposite the roller on the associated lever, either 171 or 172, that lever is permitted to move forwardly under the action of spring means associated with the latches so that the latch whose link swings forwardly is moved into a position to engage with the swingable hitch whenever it is swung over toward that side. On the other hand, whenever the projection portion of the associated cam member comes into engagement with the roller on the associated lever, 171 or 172, that lever causes the associated latch link to be shifted rearwardly, thus disengaging the associated latch from the hitch, whereby the latter is freed for swinging movement toward the other side. The next time the other clutch is operated the cam members 185 and 186 are advanced another 45 degrees, thus reversing the relations of the latches. In this way, whenever either of the clutches is operated to swing the associated crank 83 and link 84 from lowered to raised position, the associated rod 191 is shifted to advance the associated cam mechanism to a point sufficient to pull one latch away from the hitch and permit the other latch to move into a position engaging the hitch when it is shifted to that side. However, during the first part of the movement of the crank 83 as it is rotated back to its lowered position the pawl 194 merely moves forwardly away from the associated ratchet wheel 187, whereby the operation of either of the clutches when moving from a raised position to a lowered position has no effect so far as advancing the cam means is concerned. Thus, one lach is released when one of the plowing units is raised, but the relationship of the latches is not changed by the fact that as soon as the outfit has been turned around the other clutch is operated to lower the other plowing unit. However, at the end of the next round, when said other plowing unit is to be raised the consequent operation of the clutch associated with that unit now serves to advance the cam mechanism, thus releasing the hitch latch that previously held the hitch in position so that now the hitch is free to turn toward the other side and, at the same time, the latch at the other side is disposed in a position ready to engage the hitch when it is swung to that side and to lock it in that position. In this way, merely by raising one or the other of the plowing units through the associated power lifting apparatus, the hitch latches are properly controlled to lock the hitch, first at one side and next at the other side of the plow, in succession.

There may arrive times, however, when the operator desires to raise the plow out of operating position but without reversing the position of the hitch controlling latches. According to the present invention this operation may be accommodated by momentarily disabling the connection between the lifting mechanism and the hitching controlling latches. Referring now more particularly to Figure 4, a bracket 201 is bolted to each of the brackets 166 and 167 and rockingly supports a swingable bail member 205 which is provided with a pair of arms 206 and 207. Each of the arms 206 and 207 is provided with a laterally outturned section 208 on which a small plate 209 is fixed, as by welding, the plate 209 being disposed at a certain angle to and disposed in the plane of the associated cam advancing pawls 194. The rocking member 205 is provided with a rearwardly and upwardly extending operating lever or arm 212 to which the rear end of a cable 213 is fixed. Forwardly of the arm 212 the cable 213 is provided with a knot 215, and this knot is normally engaged in the narrowed section 216 of a loop 217 bolted to the upper end of a standard or strut 218 which, at its lower end, is secured to a plate 219 carried by the laterally swingable hitch 101. Laterally extending arms 221 and 222 are also carried by the standard 218 and these arms have loops through which the clutch controlling cables 78 are supported. The knot 215 is disposed in such a position that it normally holds the ends of the bail 205 out of the path of movement of the pawls 194. This permits the cam operating mechanism to advance the cams and control the latches that in turn control the position of the hitch 101. However, if the operator should momentarily desire to raise the plowing unit in operation and then after a short distance of travel, as over a terrace, a drain channel, or the like, to immediately drop the same operating unit, which would require that the hitch 101 be held in the same position, it is necessary to disable the cam operating mechanism. According to the present invention, this is done by the operator releasing the knot 215 from the loop 217 and permitting the spring 224, which is connected between the plate 161 and the lever 212, to swing the latter rearwardly, elevating the forward extensions 209 up into a position such that, when the clutch or clutches are operated, the pawls 194 are not permitted to engage the ratchets 187. Hence, the hitch latches 109 and 110 are unaffected and the hitch member 101 remains latched in its original position. After dropping the plow bottoms so as to resume normal operation, the operator may condition the implement for automatically shifting the hitch latches at the end of the row merely by pulling forward on the cable 213 and engaging the knot 215 in the narrow portion 216 of the loop 217.

It will be noted, particularly from Figure 2, that the plow is a constant lift plow since the slots 44 in the outer ends of the arms 41 are horizontal, or more particularly, perpendicular with respect to the lifting bail straps 51, because in this position the unit that is raised is always raised to substantially the same position entirely independently of the position of the pivot block 45 along the threaded portion 48 of the crank screw that adjusts the pivot block 45. However, when the plow is in lowered or operating position, the operating depth is controlled by the position of the pivot block 45 with respect to the arm 41.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A two-way plow comprising a frame, a pair of wheels and a live axle to which said wheels are fixed carrying said frame, a pair of right and left hand units movably connected with said frame, a clutch casing carried by the latter and having a portion receiving said live axle, a pair of separately operable part-revolution clutches in said casing, means connecting one clutch to the right hand unit, means connecting the other clutch to the left hand unit, and means within said casing portion for driving both of said clutches from said live axle.

2. A towed two-way plow comprising a wheeled frame, a pair of right and left hand units connected therewith for movement into and out of working position, a hitch pivoted thereto and swingable laterally from one position to another, depending on which of said units is in working position, a pair of latches, one for each position, for optionally locking said hitch in either position, means for controlling said latches comprising a pair of simultaneously operable cam sections adapted to move either latch out of engaged position and release the other latch for engagement with said hitch, a pair of half-revolution clutches connected to raise said units, and mechanism for causing each of said clutches to operate said cam sections and control said latches.

3. A two-way plow of the tractor drawn type, comprising a frame, a pair of right and left hand units movably connected with said frame and adapted to be alternately lowered into an operating position, a hitch pivotally connected with the central portion of the frame for lateral swinging so as to be disposable in a position with the front end thereof generally in the line of draft passing through the unit in lowered position, mechanism for raising and lowering said units alternately, means actuated by said mechanism for controlling the position of said hitch, and means for disabling said hitch controlling means whereby said units may be raised and lowered without affecting said hitch.

4. An agricultural implement of the tractor drawn type, comprising a frame, a hitch pivoted to the frame for lateral movement into and out of two separate positions, a pair of latches operable, respectively, to hold said hitch in either of its positions, tool means adapted to be shifted from one position to the other, means for controlling said latches comprising a pair of simultaneously operable cam sections adapted to move either latch out of engaged position and release the other latch for engagement with said hitch, self-interrupting clutch mechanism for shifting said tool means, releasable means actuated by said mechanism for moving said cam sections according to the position of said tool means, and optionally operable means for releasing said releasable means whereby operation of said clutch mechanism may take place without moving said cam sections.

5. The invention set forth in claim 4, further characterized by said cam moving means including a ratchet connected with said cam sections and a pawl operated by said clutch mechanism for advancing said cam sections.

6. The invention set forth in claim 4, further characterized by said cam moving means including a ratchet connected with said cam sections and a pawl operated by said clutch mechanism for advancing said cam sections, said optionally operable means comprising a part disposable in a position to hold said ratchet and pawl separated.

7. A tractor propelled two-way plow comprising a wheel-supported frame, a pair of right and left hand plowing units movably connected with said frame, means for raising either or both of said units into inoperative position, a hitch member pivotally connected with said frame for lateral swinging so as to dispose the forward end of said hitch member in line with the plowing unit in lowered position, latch means for holding the hitch member in either of its laterally disposed positions, latch controlling means releasably connected with said raising means and operative whenever either plowing unit is moved into a raised position to operate said latch means and release said hitch for movement into its other position, and means providing for raising and lowering either of said plowing units without releasing the hitch, comprising means for temporarily disconnecting said latch controlling means from said raising means.

8. In an agricultural implement having a frame, a live axle journaled thereon, a pair of wheels fixed to said axle, a shiftable hitch member movable into and out of two separate positions, latch means operable alternately to hold said hitch member in one or the other of said positions, and cam means for operating said latch means alternately, the combination therewith of a pair of ratchet members fixedly connected with said cam means for operating the same, a pair of separately operable part-revolution clutches, means for driving both of said clutches from said live axle, and a pair of pawl members connecting said clutches with said ratchet members, respectively, whereby the operation of either of said clutches acts through one or the other of said ratchet members to operate said cam means and control said latch means.

9. In an agricultural implement having a shiftable member movable into and out of two separate positions, latch means operable alternately to hold said member in one or the other of said positions, and cam means for operating said latch means alternately, the combination therewith of a pair of ratchet members fixedly connected with said cam means for operating the same, a pair of separately operable part-revolution clutches, means for driving both of said clutches, and a pair of pawl members connecting said clutches with said ratchet members, respectively, whereby the operation of either of said clutches acts through one or the other of said ratchet members to operate said cam means and control said latch means.

10. In an agricultural implement, a frame, a pair of right and left hand units movably connected with said frame and adapted to be moved separately into and out of working position, a member pivotally connected with said frame for swinging movement so as to be disposable in a position with the front end thereof generally in the line of draft passing through the unit in working position, mechanism for moving said units separately, means actuated by said mechanism for controlling the position of said member, and means for disabling said controlling means whereby said units may be moved into and out of working position without affecting said member.

11. In an agricultural implement, a frame, a pair of right and left hand units movably connected with said frame and adapted to be moved separately into and out of working position, a hitch member pivotally connected with said frame for swinging movement so as to be disposable in a position with the front end thereof generally in the line of draft passing through the unit in working position, a pair of latches for releasably holding said hitch member in different positions, cam means for shifting said latches, a pair of ratchet wheels connected to operate said cam means, a pair of pawls for operating said ratchet wheels, a pair of clutch units for raising and lowering said units, and means for operating said pawls, respectively, from said clutch units.

12. In an agricultural implement, a frame, a pair of right and left hand units movably connected with said frame and adapted to be moved separately into and out of working position, a hitch member pivotally connected with said frame for swinging movement so as to be disposable in a position with the front end thereof generally in the line of draft passing through the unit in working position, a pair of latches for releasably holding said hitch member in different positions, cam means for shifting said latches, mechanism for moving said units separately, pawl and ratchet means for moving said cam means, and disabling means for holding the pawl means out of contact with the associated ratchet means whereby said units may be moved into and out of working position without affecting said hitch member.

13. In an agricultural implement including a frame, a laterally shiftable hitch member connected with the frame, and a pair of latches for releasably holding said hitch member in either of two positions, latch control means comprising a transverse cam shaft having a pair of cams thereon, cam follower means extending between said cams and said latches, respectively, a ratchet fixed to said cam shaft, a pawl for operating said ratchet, and disabling means comprising a movable part engageable with said pawl for moving said pawl out of connection with said ratchet.

14. In a two-way plow, a frame, a pair of right and left hand plow units connected therewith, a laterally swingable hitch member pivotally connected with said frame, a pair of laterally spaced latches for releasably holding said hitch member in either of two positions, a pair of latch controlling units, links extending therefrom to said latches, a pair of ratchet units for actuating said latch controlling units, means for supporting said ratchet and latch controlling units on said frame adjacent the pivot of said hitch member, a pair of lifting clutches mounted on said frame for raising and lowering said plow units, and a pair of pawls actuated, respectively, by said lifting clutches for operating said ratchet units.

15. In a two-way plow, a frame, a live axle parallel therein, ground wheels connected with said axle for driving the same, a pair of right and left hand plow units connected with said frame, a laterally swingable hitch member pivotally connected with said frame, a pair of laterally spaced latches for releasably holding said hitch member in either of two positions, a pair of latch controlling units, links extending therefrom to said latches, a pair of ratchet units for actuating said latch controlling units, means for supporting said ratchet and latch controlling units on said frame adjacent the pivot of said hitch member, a pair of lifting clutches mounted on said frame for raising and lowering said plow units, means for driving said clutches from said axle, and a pair of pawl links connected with said clutch cranks, respectively, and extending therefrom forwardly to said ratchet units, respectively, for actuating the latter and said latch cams.

16. In a two-way plow, a frame, a live axle journaled therein, ground wheels connected with said axle for driving the same, a pair of right and left hand plow units connected with said frame, an elongated clutch casing carried at one end on said frame, the other end of said casing receiving and supported on said axle, a pair of separately actuable clutches carried in said casing and driven from said axle, each clutch including a lifting crank disposed exteriorly of said casing, a laterally swingable hitch member pivotally connected with said frame, a pair of laterally spaced latches for releasably holding said hitch member in either of two positions, a pair of latch controlling units, and means connected with said lifting cranks for actuating said latch controlling units.

17. In a two-way plow having a laterally swingable hitch member and latches for releasably holding said member in either of two positions, a latch-controlling cam unit comprising a cam shaft, a pair of cams thereon, a support for said shaft, a pair of cam follower levers pivotally mounted on said support, a pair of ratchets on said shaft, a pair of oscillatable pawls for advancing said ratchets, and a disabler member movably mounted on said support and including means engageable with said pawls for holding them out of operative connection with said ratchets.

18. In a two-way plow having a laterally swingable hitch member and latches for releasably holding said member in either of two positions, a latch-controlling cam unit comprising a cam shaft, a pair of cams thereon, a support for said shaft, a pair of cam follower levers pivotally mounted on said support, a pair of ratchets on said shaft, a pair of oscillatable pawls for advancing said ratchets, and a disabling lever pivotally mounted on said support and including a pair of pawl-engaging sections for holding said pawls out of operative connection with said ratchets.

OREY W. OERMAN.

REFERENCES CITED

The following references are of record in the file of this patent:

UNITED STATES PATENTS

| Number | Name | Date |
|---|---|---|
| 1,265,902 | Gerhard | May 14, 1918 |
| 1,377,047 | Altgelt | May 3, 1921 |
| 1,765,788 | Daniel | June 24, 1930 |
| 1,813,506 | Strandlund | July 7, 1931 |
| 1,817,085 | Lindgren et al. | Aug. 4, 1931 |
| 1,832,010 | Gallagher | Nov. 17, 1931 |
| 1,864,639 | Grezee | June 28, 1932 |
| 1,864,958 | Strandlund | June 28, 1932 |
| 2,188,413 | Markel | Jan. 30, 1940 |
| 2,249,861 | Silver | July 22, 1941 |
| 2,298,553 | Ego | Oct. 13, 1942 |
| 2,327,927 | Orelind | Aug. 24, 1943 |
| 2,329,193 | Frank | Sept. 14, 1943 |
| 2,363,901 | Silver | Nov. 28, 1944 |
| 2,385,935 | Oerman | Oct. 2, 1945 |
| 2,433,147 | Orelind et al. | Dec. 23, 1947 |
| 2,437,879 | Ferguson | Mar. 16, 1948 |
| 2,440,782 | Orelind | May 4, 1948 |

FOREIGN PATENTS

| Number | Country | Date |
|---|---|---|
| 544,041 | Great Britain | Mar. 25, 1942 |